May 12, 1942.  P. BELL  2,283,034
ELECTRIC METER
Filed July 5, 1939
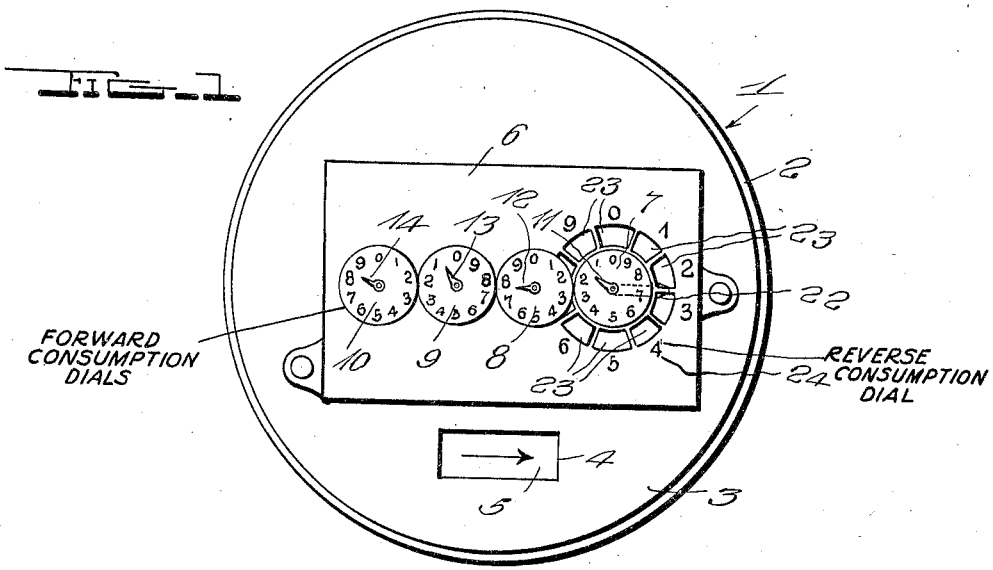
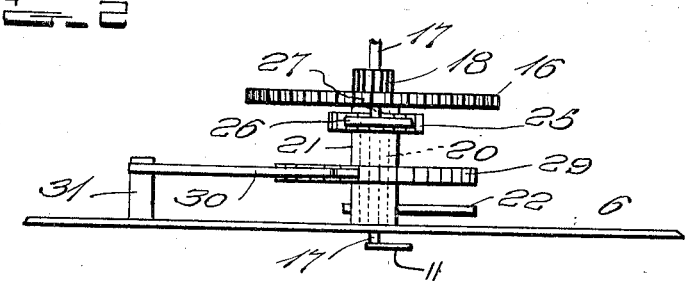
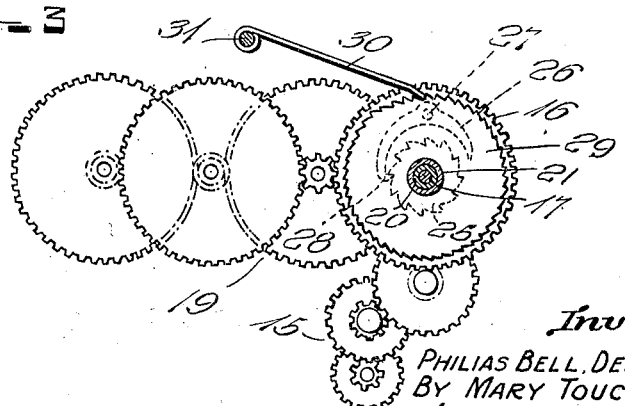
Inventor.
PHILIAS BELL, DECEASED
BY MARY TOUCHETTE,
ADMINISTRATRIX.
BY
Ross J. Woodward, ATTORNEY.

Patented May 12, 1942

2,283,034

UNITED STATES PATENT OFFICE 2,283,034

ELECTRIC METER

Philias Bell, deceased, late of Montreal, Quebec, Canada, by Mary Touchette, administratrix, Montreal, Quebec, Canada, assignor to Joseph Adeodat Laporte, Montreal, Quebec, Canada Application July 5, 1939, Serial No. 282,925 In Canada July 20, 1938

1 Claim. (Cl. 171—34)

This invention relates to electric meters having means for indicating flow of electric current through the meter without being properly registered thereby.

Electric meters of conventional construction can be so tampered with that the current will be reversed and so flow through the meter that the meter will run backwards. It will thus be seen that by reversing the normal flow of current through the meter for a certain length of time, and then restoring its flow in the normal direction, the meter can be caused to show a false reading and current which has been actually used will not be charged for.

Therefore, one object of the present invention is to so construct the meter that it will not only clearly show that the meter has been tampered with and the directional flow of current reversed, but it also will accurately indicate the amount of current which has been incorrectly passed through the meter. Thus, when the meter is read by the employee of the company furnishing the current, he will at once see that the meter has been tampered with and may not only report this fact to the company officials, but also be enabled to accurately calculate the amount of current used.

Another object of the invention is to provide an electric meter so constructed that the means for indicating and registering incorrect flow of current through the meter will be inactive when current is flowing through the meter in the proper direction but will be set in operation when directional flow of the current is reversed.

Another object of the invention is to provide a meter having the means for indicating and registering incorrect flow of current built into the gearing thereof, actuation of said means being controlled by a pawl and ratchet wheel rendered operative only when the flow of current is reversed.

The invention is illustrated in the accompanying drawing, wherein:

Fig. 1 is a front elevation of the improved meter.

Fig. 2 is a top plan view of the gearing of the meter.

Fig. 3 is a view showing the gearing in elevation.

The electric meter which is indicated in general by the numeral 1, has the usual casing 2 including a front wall 3 formed with an opening 4 through which the rotary disc 5 is exposed. There has also been provided the usual face plate 6 bearing dials 7, 8, 9 and 10 with which the pointers 11, 12, 13 and 14 cooperate to indicate current which has passed through the meter. This is conventional construction and, in order that movement may be transmitted from the disc 5 to the pointers, there is employed the usual train of gearing 15 meshing with the gear 16 carried by the shaft 17 upon which the pointer of the dial 7 is fixed. This shaft also carries the small gear or pinion 18 by means of which rotary motion is transmitted to the pointers 12, 13 and 14 through the medium of the train of gearing 19 in the usual manner. It will thus be seen that the subject matter of this invention may be incorporated in a meter of conventional construction.

When incorporating the invention in a meter of conventional construction, a sleeve 20 is disposed about the shaft 17 and has one end fixed to the inner surface of the face plate 6. About this sleeve 20 is rotatably mounted a sleeve 21 carrying a pointer 22 of such length that as the sleeve 21 is rotated, the free end of the pointer will be successively exposed through the openings 23 formed in a circular path surrounding the dial 7 in concentric relation thereto. There are ten of these openings and each is accompanied by a number located outwardly from the opening. These numbers progress from "1" to "0" and form an auxiliary dial 24 surrounding the openings concentric to the dial 7. Since the pointer 22 is visible through the openings 23, it will act with the dial 24 to indicate current which has been illegally used.

In order that the sleeve 21 may be turned when the meter is run backward by reversing directional flow of current through it, there has been provided a ratchet 25 at the rear or inner end of the sleeve, this ratchet being engaged by a pawl 26 pivotally mounted by a pin 27 projecting from the gear 16. When the meter is operating in a normal manner and the gear 16 turning toward the left in Fig. 3, the tooth 28 of the pawl will slide over the teeth of the ratchet and the sleeve 21 and its pointer 22 remain stationary, but when flow of current through the meter is reversed and the gear 16 turns toward the right in Fig. 3, the pawl will operatively engage the ratchet wheel and cause the sleeve and its pointer to turn. The pointer will then move from one number of the scale 24 to another and not only indicate that current has been illegally used but also show the quantity of current so used. This will be instantly noted by the meter reader, who will report the same to the proper officials of the company furnishing the current and, in addition, the meter reader will calculate the reading of the auxiliary dial and add the proper addition to the reading of the regular dials.

During normal operation of the meter it is not desired to have the sleeve 21 turned by frictional drag of the pawl as the hooked end of the pawl slides over the teeth of the ratchet 25. In order to prevent this undesired turning of the sleeve, there has been provided a large ratchet disc 29 which is fixedly carried by the sleeve 21 and has its toothed edge engaged by the free end of the dog 30. This dog consists of a strip of resilient metal having one end secured about a pin or post 31 extending from the face plate 6, and upon referring to Figs. 2 and 3, it will be seen that the dog is of such length that its free end rests upon the toothed edge of the ratchet disc. Fig. 3 clearly shows that while the disc and sleeve may be turned toward the right by the pawl 26, turning of the same toward the left during normal operation of the meter will be prevented. Thus, the auxiliary recording means will be inactive during normal operation of the meter and will be set in motion when flow of current through the meter is reversed.

Having thus described the invention, what is claimed is:

In a meter, a face plate bearing main dials, one of which is a unit dial, and a train of gearing back of the face plate having rotary shafts passing through said face plate, pointers carried by the forward ends of the rotary shafts in cooperating relation to said dials, the face plate being formed with sight openings arranged in a circular path about the unit dial, markings forming an auxiliary dial being provided upon the face plate at ends of the sight openings, a mounting sleeve fixed at one end to the face plate and extending therefrom about the shaft for the pointer of the unit dial, an outer sleeve rotatable about the mounting sleeve, a pointer for the auxiliary dial carried by the outer sleeve and extending radially therefrom and having a portion exposed through the openings of the face plate during turning of the outer sleeve, a ratchet wheel carried by the outer sleeve, a pawl pivoted intermediate its ends to the forward side face of the gear of the shaft carrying the pointer for the unit dial, said pawl straddling said ratchet wheel and having a bill at one end adapted to slide over teeth of the ratchet wheel during turning of the gear in a normal direction and adapted to engage teeth of the ratchet and turn the outer sleeve to impart movement to the auxiliary pointer when the gear is turned during flow of current in reverse direction through the meter, a ratchet disc carried by the outer sleeve, and a dog engaging the ratchet disc to prevent turning of the outer sleeve in a retrograde direction.

MARY TOUCHETTE,
*Administratrix of the Estate of Philias Bell, Deceased.*